(12) United States Patent
Matsunaga et al.

(10) Patent No.: US 9,701,587 B2
(45) Date of Patent: Jul. 11, 2017

(54) METHOD FOR PRODUCING INORGANIC FIBER-BONDED CERAMIC MATERIAL

(71) Applicant: Ube Industries, Ltd., Ube-shi (JP)

(72) Inventors: Kenji Matsunaga, Ube (JP); Shinji Kajii, Ube (JP); Shohei Suizu, Ube (JP); Tsutomu Kodama, Ube (JP)

(73) Assignee: Ube Industries, Ltd., Ube-shi (JP)

( * ) Notice: Subject to any disclaimer, the term of this patent is extended or adjusted under 35 U.S.C. 154(b) by 360 days.

(21) Appl. No.: 14/387,713

(22) PCT Filed: Mar. 21, 2013

(86) PCT No.: PCT/JP2013/058016
§ 371 (c)(1),
(2) Date: Sep. 24, 2014

(87) PCT Pub. No.: WO2013/146514
PCT Pub. Date: Oct. 3, 2013

(65) Prior Publication Data
US 2015/0137411 A1 May 21, 2015

(30) Foreign Application Priority Data

Mar. 29, 2012 (JP) ................................ 2012-075315

(51) Int. Cl.
*C03B 29/00* (2006.01)
*B29C 65/00* (2006.01)
(Continued)

(52) U.S. Cl.
CPC ............ *C04B 35/645* (2013.01); *B29C 43/10* (2013.01); *B29C 43/14* (2013.01); *B32B 18/00* (2013.01);
(Continued)

(58) Field of Classification Search
CPC ............ C04B 35/645; C04B 35/62849; C04B 35/62897; C04B 2235/524;
(Continued)

(56) References Cited

U.S. PATENT DOCUMENTS

| 4,428,906 A | * | 1/1984 | Rozmus | ................ B22F 3/1216 419/48 |
| 5,348,694 A | * | 9/1994 | Goldberger | ............. C04B 35/52 264/109 |

(Continued)

FOREIGN PATENT DOCUMENTS

| CA | 2794693 A1 | 10/2011 |
| JP | 616180 A | 1/1986 |

(Continued)

OTHER PUBLICATIONS

Ishikawa et al. "JP 07-069747, machine translation", Published Apr. 14, 1995.*
"Hot pressing", Wikipedia, Aug. 9, 2016, pp. 1-4, XP055314308.

*Primary Examiner* — Alex Efta
(74) *Attorney, Agent, or Firm* — The Webb Law Firm (57) ABSTRACT

Provided is a method for producing an inorganic fiber-bonded ceramic material, which can produce, at a high yield, an inorganic fiber-bonded ceramic material with fewer defects, and with an end part and a central part equivalent to each other in microstructure and mechanical properties, and also makes it possible to increase the ceramic material in size. The method for producing an inorganic fiber-bonded ceramic material is characterized in that it includes: a first pressing step of setting, in a carbon die, a laminate to be surrounded by a ceramic powder, the laminate obtained by stacking a coated inorganic fiber shaped product including an inorganic fiber part of inorganic fibers that have a pyrolysis initiation temperature of 1900° C. or lower, and a surface layer of an inorganic substance for bonding the (Continued)

inorganic fibers to each other, and pressing the laminate at a temperature of 1000 to 1800° C. and a pressure of 5 to 50 MPa in an inert gas atmosphere; and a second pressing step of pressing a ceramic coated laminate obtained in the first pressing step at a temperature of 1600 to 1900° C., which is higher than that in the first pressing step, and at a pressure of 5 to 100 MPa in an inert gas atmosphere.

6 Claims, 5 Drawing Sheets (51) Int. Cl.
| | |
|---|---|
| *B60J 10/00* | (2016.01) |
| *B32B 27/00* | (2006.01) |
| *C04B 33/32* | (2006.01) |
| *C04B 33/36* | (2006.01) |
| *C04B 35/64* | (2006.01) |
| *C04B 35/645* | (2006.01) |
| *B29C 43/10* | (2006.01) |
| *C04B 35/626* | (2006.01) |
| *B29C 43/14* | (2006.01) |
| *C04B 35/593* | (2006.01) |
| *C04B 35/80* | (2006.01) |
| *B32B 18/00* | (2006.01) |
| *C04B 35/628* | (2006.01) |
| *C04B 35/10* | (2006.01) |
| *B29C 43/32* | (2006.01) |

(52) U.S. Cl.
CPC ............ *C04B 35/10* (2013.01); *C04B 35/593* (2013.01); *C04B 35/6268* (2013.01); *C04B 35/62849* (2013.01); *C04B 35/62897* (2013.01); *C04B 35/80* (2013.01); *B29C 2043/106* (2013.01); *B29C 2043/3205* (2013.01); *C04B 2235/524* (2013.01); *C04B 2235/5244* (2013.01); *C04B 2235/5256* (2013.01); *C04B 2235/5264* (2013.01); *C04B 2235/6587* (2013.01); *C04B 2235/661* (2013.01); *C04B 2235/96* (2013.01); *C04B 2237/38* (2013.01); *C04B 2237/70* (2013.01)

(58) Field of Classification Search
CPC .... C04B 2235/5244; C04B 2235/5256; C04B 2235/5264; C04B 2235/6587; C04B 2235/661; C04B 2235/96; C04B 2235/38; C04B 2235/70; C04B 35/593; C04B 35/6268; B30B 11/001; B29C 43/10; B29C 2043/106; B29C 2043/3205; B29C 2043/3655; B29C 2043/3668; B29C 35/3628

See application file for complete search history.

(56) References Cited

U.S. PATENT DOCUMENTS

| | | | |
|---|---|---|---|
| 5,855,997 A | | 1/1999 | Amateau |
| 2004/0029704 A1* | | 2/2004 | Kajii ..................... B32B 18/00 501/88 |

FOREIGN PATENT DOCUMENTS

| | | | | |
|---|---|---|---|---|
| JP | 543338 | A | | 2/1993 |
| JP | 769747 | A | | 3/1995 |
| JP | 07069747 | A | * | 3/1995 |
| JP | 952776 | A | | 2/1997 |
| JP | 09278537 | A | * | 10/1997 |
| JP | 9278537 | A | | 10/1997 |
| JP | 2004131365 | A | | 4/2004 |
| JP | 2005112658 | A | | 4/2005 |
| JP | CA 2794693 | A1 | * | 10/2011 ............ B32B 18/00 |

* cited by examiner

(a) EXAMPLE 1

(b) EXAMPLE 2

(c) COMPARATIVE EXAMPLE 1

(d) COMPARATIVE EXAMPLE 2

(a) EXAMPLE 2

(b) COMPARATIVE EXAMPLE 2

METHOD FOR PRODUCING INORGANIC FIBER-BONDED CERAMIC MATERIAL

CROSS-REFERENCE TO RELATED APPLICATIONS

This application is the United States national phase of International Application No. PCT/JP2013/058016 filed Mar. 21, 2013, and claims priority to Japanese Patent Application No. 2012-075315 filed Mar. 29, 2012, the disclosures of which are hereby incorporated in their entirety by reference.

TECHNICAL FIELD

The present invention relates to a method for producing an inorganic fiber-bonded ceramic material, which can produce, at a high yield, an inorganic fiber-bonded ceramic material with fewer defects, and with an end and a central part equivalent to each other in microstructure and mechanical properties, and also makes it possible to increase the ceramic material in size.

BACKGROUND ART

In recent years, in aerospace fields and environmental and energy fields, highly reliable materials have been desired which are excellent in heat resistance and high in both heat insulation property and mechanical properties, in order to achieve higher efficiency and higher energy. Candidate materials therefor include inorganic fiber-bonded ceramic materials as an example. The inorganic fiber-bonded ceramic materials are insensitive to defects and high in fracture resistance, as compared with simple ceramics. In addition, the inorganic fiber-bonded ceramic materials are highly dense as compared with ceramic fiber-reinforced ceramic-matrix composites (CMC) produced by chemical vapor infiltration methods (CVI methods) or polymer infiltration and pyrolysis methods (PIP methods), and subjected to machining to provide high surface smoothness.

Such an inorganic fiber-bonded ceramic material is disclosed in, for example, Patent Literature 1. Briefly, the inorganic fiber-bonded ceramic material described in Patent Literature 1 is obtained by applying hot pressing under high temperature and pressure to a laminate of ceramic fibers containing, as their main constituent, Si-M-C—O (M represents Ti or Zr) covered with a surface layer containing $SiO_2$ as its main constituent, and in the hot press process, some C in the Si-M-C—O fiber is produced on the fiber surface, and further, M in the Si-M-C—O fiber reacts with C to provide a structure including fine particles of MC dispersed in the inorganic substance. Accordingly, the structure of the inorganic fiber-bonded ceramic material is created in the hot press process under high temperature and pressure with the use of a pyrolysis reaction of the raw fiber. In other words, in order to obtain a favorable inorganic fiber-bonded ceramic structure, it is necessary to rigorously control the pyrolysis reaction in the hot pressing process.

CITATION LIST

Patent Literature

Patent Literature 1: JP 9-52776 A

SUMMARY OF INVENTION

Technical Problem

As described above, the inorganic fiber-bonded ceramic materials are excellent in heat resistance, and high in both heat insulation property and mechanical property, but have the following problems because of the need to rigorously control the pyrolysis reaction.
(1) A carbon die for use in the hot press process produces, when used several times, a gap between surfaces for mating dies to reduce the dimensional accuracy of the gap between the dies, and increase the amount of pyrolysis gas emissions from the gap between the dies. Therefore, the end of a material close to the carbon die fails to have the original structure of the inorganic fiber-bonded ceramic material, and fails to achieve the high mechanical properties.
(2) Unless the laminate of the coated inorganic fiber is molded to have accurate external dimensions, the end of a material close to the carbon die fails to have the original structure of the inorganic fiber-bonded ceramic material, and fails to achieve the high mechanical properties as in the case of the (1) mentioned above, and moreover, the mechanical properties are degraded over the entire material. Therefore, it is necessary to prepare a laminate with high dimensional accuracy, which requires much time.
(3) When an attempt is made to increase the inorganic fiber-bonded ceramic material in size, the size of the laminate has to be increased, and the load put on punching bars and the carbon die is increased to more frequently cause sudden breakage of the die or upper or lower punching bars.
(4) When an attempt is made to increase the inorganic fiber-bonded ceramic material in size, heterogeneity in structure will be produced due to a difference in the amount of pyrolysis gas emissions between an end of and a central part of the laminate.

As just described, in order to produce, at a high yield and at a reduced cost, an inorganic fiber-bonded ceramic material which is stable in quality with an end and a central part equivalent to each other in microstructure and mechanical properties, while the pyrolysis in the hot press process is rigorously controlled, and in order to promote the increased size of the inorganic fiber-bonded ceramic material, the prior method for producing an inorganic fiber bonded ceramic is not able to be considered always sufficient.

The present invention has been achieved in view of the problems mentioned above, and an object of the present invention is to provide a method for producing an inorganic fiber-bonded ceramic material, which can produce, at a high yield, an inorganic fiber-bonded ceramic material with fewer defects, and with an end and a central part equivalent to each other in microstructure and mechanical properties, and also makes it possible to increase the ceramic material in size.

Solution to Problem

In order to achieve the object mentioned above, the inventors have found, as a result of earnest studies, that a ceramic powder is arranged around a laminate, and two-stage hot pressing is carried out such that the ceramic powder is brought into a hermetically sealed condition in advance to such an extent that the emission of pyrolysis gas from the inorganic fiber can be reduced in the first-stage pressing of the two-stage hot pressing to make the pyrolysis reaction of the inorganic fiber in the second-stage press process homogeneous throughout the entire shaped product, thereby making it possible to produce, at a high yield, an inorganic fiber-bonded ceramic material with fewer defects, and with an end and a central part equivalent to each other in microstructure and mechanical properties, and also making it possible to increase the ceramic material in size.

More specifically, the present invention provides a method for producing an in organic fiber-bonded ceramic material, comprising: a first pressing step of setting a laminate in a carbon die so as to be surrounded by a ceramic powder, the laminate being obtained by stacking a coated inorganic fiber shaped product including an inorganic fiber part formed of inorganic fibers having a pyrolysis initiation temperature of 1900° C. or lower and a surface layer formed of an inorganic substance for bonding the inorganic fibers to each other, and pressing the laminate at a temperature of 1000 to 1800° C. and a pressure of 5 to 50 MPa in an inert gas atmosphere; and a second pressing step of pressing the ceramic coated laminate obtained in the first pressing step at a temperature of 1600 to 1900° C., which is higher than that in the first pressing step, and at a pressure of 5 to 100 MPa in an inert gas atmosphere.

In the method for producing an inorganic fiber-bonded ceramic material according to the present invention, the inorganic fiber part is formed of an inorganic substance containing: (a) an amorphous substance containing Si, M, C, and O (M represents Ti or Zr); (b) an aggregate of a crystalline ultrafine particle containing β-SiC, MC, and C and an amorphous substance containing $SiO_2$ and $MO_2$ (M is the same as in (a)); or (c) a mixture of the (a) amorphous substance and the (b) aggregate, and the surface layer includes an inorganic substance containing: (d) an amorphous substance containing Si, O, and possibly M (M represents Ti or Zr); (e) a crystalline substance containing crystalline $SiO_2$ and/or $MO_2$ (M is the same as in (d)); or (f) a mixture of the (d) amorphous substance and the (e) crystalline substance.

In addition, in the method for producing an inorganic fiber-bonded ceramic material according to the present invention, the surface layer can be adapted to have a thickness T (μm) from T=aD in which a is a numerical value in a range of 0.023 to 0.090, and D denotes a fiber diameter (μm) of the coated inorganic fiber.

In addition, in the method for producing an inorganic fiber-bonded ceramic material according to the present invention, the ceramic powder can be an alumina powder.

In addition, in the method for producing an inorganic fiber-bonded ceramic material according to the present invention, the ceramic powder can be a mixture of an inorganic substance, which melts at 1800° C. or lower, and an inorganic substance having a higher melting temperature than the pressing temperature in the second pressing step, and the inorganic substance, which melts at 1800° C. or lower, can be glass containing $SiO_2$ as its main constituent, and the inorganic substance having a higher melting temperature than the pressing temperature in the second pressing step is carbon or BN. Furthermore, an ambient pressure in the first pressing step and the second pressing step can range 0.01 to 1 MPa.

Advantageous Effects of Invention

As just described, according to the present invention, a method for producing an inorganic fiber-bonded ceramic material can be provided, which can produce, at a high yield, an inorganic fiber-bonded ceramic material with fewer defects, and with an end and a central part equivalent to each other in microstructure and mechanical properties, and also makes it possible to increase the ceramic material in size.

DESCRIPTION OF EMBODIMENTS

A preferred embodiment of a method for producing an inorganic fiber-bonded ceramic material according to the present invention will be described in detail below.

The method for producing an inorganic fiber-bonded ceramic material according to the present embodiment includes: a first pressing step of setting a laminate as a raw material in a carbon die so as to be surrounded with a ceramic powder, and pressing the laminate; and a second pressing step of pressing the laminate at a higher temperature than that in the first pressing step.

In the present embodiment, the laminate as a raw material for the inorganic fiber-bonded ceramic material can be obtained by laminating a shaped product of a coated inorganic fiber including: an inorganic fiber part of inorganic fibers having a pyrolysis initiation temperature of 1900° C. or lower; and a surface layer of an inorganic substance for bonding the inorganic fibers to each other. The shaped product of the coated inorganic fiber is not particularly limited in terms of form, but can be a continuous fiber, a chopped short fiber obtained by cutting a continuous fiber, or a sheet-like fiber or fabric obtained by unidirectionally stretching a continuous fiber.

In the present embodiment, the shaped product of the coated inorganic fiber can be prepared by heating the following inorganic fiber to a temperature in the range of 500 to 1600° C. under an oxidizing atmosphere in accordance with the method described in, for example, JP 62-289641 A, so as to include: an inorganic fiber part of inorganic fibers having a pyrolysis initiation temperature of 1900° C. or lower; and a surface layer of an inorganic substance for bonding the inorganic fibers to each other. The inorganic fiber for use as a raw material for the shaped product of the coated inorganic fiber is a fibrous matter of an inorganic substance, and examples of the fiber include $Si_3N_4$ based fibers and SiC based fibers, but in particular, SiC based fibers are preferred which are excellent in strength at elevated temperature. As the SiC based fibers, SIC based ceramic fibers can be used which are commonly marketed, and typical examples include Tyranno Fiber (registered trademark) sold by Ube Industries, Ltd. and Nicalon (registered trademark) fibers sold by Nippon Carbon Co., Ltd. In particular, Tyranno Fiber (registered trademark) is preferred which is sold by Ube Industries, Ltd.

The shaped product of the coated inorganic fiber includes the inner inorganic fiber part and the surface layer outside the inorganic fiber part. The inorganic fiber part is preferably formed of an inorganic substance containing: (a) an amorphous substance containing Si, M, C and O (M represents Ti or Zr; the same shall apply hereafter); (b) an aggregate of a crystalline ultrafine particle containing β-SiC, MC and C, and an amorphous substance containing $SiO_2$ and $MO_2$; or (c) a mixture of the (a) amorphous substance and (b) aggregate mentioned above, whereas the surface layer is preferably formed of an inorganic substance containing: (d) an amorphous substance containing Si, O and possibly M; (e) a crystalline substance containing crystalline $SiO_2$ and/or $MO_2$; or (f) a mixture of the (d) amorphous substance and (e) crystalline substance mentioned above. The respective elements of the inorganic fiber constituting the inorganic fiber part preferably have typical proportions of Si: 30 to 60 mass %, M: 0.5 to 35 mass %, preferably 1 to 10 mass %, C: 25 to 40 mass %, and O: 0.01 to 30 mass %. The equivalent diameter of the coated inorganic fiber is not particularly limited, but preferably 5 to 20 μm. In addition, the surface layer of the coated inorganic fiber is preferably mainly formed of $SiO_2$.

Furthermore, varying the thickness of the surface layer of the coated inorganic fiber depending on the fiber diameter of the inorganic fiber part (the diameter of the inorganic fiber) makes it possible to further stabilize properties of the inorganic fiber-bonded ceramic material. When the fiber diameter is denoted by D μm, the thickness T μm of the surface layer preferably falls within the range of 0.023 D to 0.090 D. There is a tendency for the surface layer effect of suppressing pyrolysis of the inorganic fiber to be decreased as the thickness of the surface layer is smaller than 0.023 D. On the other hand, as the thickness of the surface layer is larger than 0.090 D, there is a tendency for the proportion of the inorganic fiber part of the coated inorganic fiber in the fiber-bonded ceramic material to be lowered to degrade properties at elevated temperature.

The method for producing an inorganic fiber-bonded ceramic material according to the present embodiment includes: a first pressing step of setting the laminate obtained in the way described above in a carbon die so as to be surrounded with a ceramic powder, and pressing the laminate at a temperature of 1000 to 1800° C. and a pressure of 5 to 50 MPa in an inert gas atmosphere; and a second pressing step of pressing the ceramic coated laminate obtained in the first step at a temperature of 1600 to 1900° C., which is higher than that in the first pressing step, and a pressure of 5 to 100 MPa in an inert gas atmosphere.

In the present embodiment, when the ceramic powder placed around the laminate is brought into a hermetically sealed condition in advance to such an extent that the emission of pyrolysis gas from the inorganic fiber can be reduced in the first-stage first pressing step of two-stage hot pressing step, the pyrolysis reaction of the inorganic fiber in the second-stage second pressing step can be made homogeneous throughout the entire shaped product.

There will be described below the ceramic powder surrounding the laminate which is a feature of the present embodiment. In the present embodiment, in order to obtain the structure of the inorganic fiber-bonded ceramic material, the ceramic powder is used in order to cover the laminate by heating at a temperature lower than the pressing temperature in the second pressing step to such an extent that the emission of pyrolysis gas from the inorganic fiber can be reduced in the first pressing step. Therefore, it is difficult to rigorously control gas in the shaped product just by simply covering with the ceramic powder, because the gas generated by pyrolysis reaction is emitted through voids within the ceramic powder. In order to rigorously control gas, there is a need for heating at a temperature lower than the pressing temperature in the second pressing step to provide a condition hermetically sealed to such an extent that the emission of pyrolysis gas can be reduced. The condition hermetically sealed to such an extent that the emission of pyrolysis gas can be reduced does not have to be a condition sealed to such an extent that the pyrolysis gas is completely blocked, but preferably a hermetically sealed condition that can maintain the composition for the structure of the inorganic fiber-bonded ceramic material. Properties of the inorganic fiber-bonded ceramic material such as yield and strength vary depending on the hermetically sealed condition, and the hermetically sealed condition may be thus managed depending on purposes and requests.

The gas generated by pyrolysis needs to be appropriately released to the outside of the die in some cases. As long as the temperature can be controlled at which the ceramic powder is brought into a hermetically sealed condition, the release and suppression of the pyrolysis gas can be controlled. For example, where the composition of the inorganic fiber-bonded ceramic material is rigorously controlled at the stage of a raw fiber, the temperature at which the ceramic powder is brought into a hermetically sealed condition is lowered so that no pyrolysis gas is released to the outside of the die. Alternatively, where it is desirable to reversely increase the release of pyrolysis gas, the temperature is increased at which the ceramic powder is brought into a hermetically sealed condition. The release and suppression of the pyrolysis gas can be controlled by varying the type and composition of the ceramic powder and controlling the temperature at which the ceramic powder is brought into a hermetically sealed condition, depending on the situation of the pyrolysis reaction of the inorganic fiber.

It is preferred that a ceramic powder sintered in the range of 1000 to 1800° C. is used as the ceramic powder surrounding the laminate. Such ceramic powders include alumina powder sintered and brought into a hermetically sealed condition in the range of 1300 to 1500° C. The alumina powders are preferred for use, because the powders are relatively inexpensive, easily available, and excellent in stability at elevated temperature.

In addition, the ceramic powder may be a mixture of an inorganic substance which melts at 1800° C. or lower and an inorganic substance which has a higher melting temperature than the pressing temperature of the second pressing step. Examples of the inorganic substance which melts at 1800° C. or lower include quartz glass and aluminosilicate glass. In addition, examples of the inorganic substance which has a higher melting temperature than the pressing temperature of the second pressing step include carbon, SiC, and BN. Preferred combinations include, in particular, a combination of glass containing $SiO_2$ at its main constituent as the inorganic substance melted at 1800° C. or lower, and BN as the inorganic substance which has a higher melting temperature than the pressing temperature of the second pressing step. The use of the mixture of the glass containing $SiO_2$ at its main constituent and the BN powder hermetically seals voids within the BN powder with the softened or melted $SiO_2$ to cover the laminate with the densified ceramic material which can suppress pyrolysis gas emission in the range of 1300 to 1500° C., thereby making it possible to control the pyrolysis gas.

As just described, one of the points in the present embodiment is that the laminate surrounded with the ceramic powder in the first pressing step is heated at a temperature equal to or lower than the pressing temperature of the second pressing step to bring the periphery of the laminate into a hermetically sealed condition with the ceramic material to such an extent that the emission of pyrolysis gas can be suppressed. This can solve the following three problems.

The first problem is the lifetime of the carbon die. As described above, typically, the inorganic fiber-bonded ceramic material achieves its fine and complex structure by controlling pyrolysis of the raw fiber in the process of hot pressing. In the process of hot pressing, the composition in the raw fiber is controlled while releasing gas (SiO, CO, etc.) derived from the elements constituting the fiber, which is generated by pyrolysis reaction, through the gap between the dies to the outside. In this case, the reaction of the carbon die with the released gas produces a carbide or oxide containing Si as its main constituent on the surface of the carbon die. Therefore, when the carbon die is used several times, the produced carbide or the like will be deposited to produce a gap between mating surfaces of the dies. Furthermore, when an attempt is made to remove the carbide or the like, a portion of the carbon die will be chipped off along with the carbide or the like, and a gap will be likewise produced between the mating surfaces of the dies. Thus, the dimensional accuracy of the gap between the dies is reduced to increase the amount of pyrolysis gas emissions from the gap between the dies, and an end part of the ceramic material near the carbon die fails to have the normal structure of the inorganic fiber-bonded ceramic material, thereby failing to achieve any high mechanical properties. Moreover, the reduced dimensional accuracy may deteriorate the mechanical properties of the entire material in some cases. Thus, there is a need for the carbon die to be frequently exchanged, though the frequency of exchange varies depending on the hot pressing condition. Therefore, there is a need to reduce the cost of the die because the die is costly.

The second problem is that even if the dimensional accuracy of the die is kept constant, unless the laminate of the coated inorganic fiber is shaped with accuracy of external dimensions, the variation in gap between the dice and the laminate like the first problem leads to an unequal amount of pyrolysis gas emissions, resulting in failure to rigorously control the pyrolysis reaction. However, the coated inorganic fiber varies in cutting dimension because of its significantly poor workability, and when this variation is increased, an end part of the material near the carbon die fails to have the normal structure of the inorganic fiber-bonded ceramic material, thereby failing to achieve any high mechanical properties. Moreover, the reduced dimensional accuracy may deteriorate the mechanical properties of the entire material in some cases. Therefore, there is a need to prepare a laminate with a high degree of dimensional accuracy, which requires time.

Moreover, as the third problem, structure heterogeneity is listed which is caused by the difference in the amount of pyrolysis gas emissions between an end part and a central part of the laminate, with the increase in size of inorganic fiber-bonded ceramic material. As also mentioned in association with the first problem, the inorganic fiber-bonded ceramic material achieves its fine microstructure by controlling the composition in the raw fiber while releasing gas (SiO, CO, etc.) derived from the elements constituting the fiber, which is generated by pyrolysis reaction in the process of the hot pressing process, through the gap between the dies. Therefore, when the inorganic fiber-bonded ceramic material undergoes an increase in size, structure heterogeneity is produced between the end part and central part of the shaped product, due to the difference in holding time at the target temperature, as well as ease of releasing pyrolysis gas, etc. For example, when the molding temperature and the holding time are respectively set to 1800° C. and 1 hour, the end part of the shaped product reaches the target temperature earlier as compared with the central part thereof. In some cases, a difference in temperature may be produced between the end part and the central part. In such a case, the amount and timing of pyrolysis gas generation vary depending on differences in molding temperature and holding time between the end part and the central part. In order to increase the size of the shaped inorganic fiber-bonded ceramic material, there is a need to equalize the amounts of pyrolysis gas generation and release between the end part and central part of the shaped product.

According to the present embodiment, the ceramic powder is brought in advance into a condition hermetically sealed to such an extent that the emission of pyrolysis gas from the inorganic fiber can be reduced in the first pressing step to equalize pyrolysis reaction of the inorganic fiber in the second pressing step through the entire shaped product. As a result, it is possible to solve the three problems mentioned above, to produce, at a high yield, an inorganic fiber-bonded ceramic material with fewer defects, and with an end and a central part equivalent to each other in microstructure and mechanical properties, and also to increase the ceramic material in size.

Furthermore, the ceramic powder is preferably a flowable powder. This powder can solve even the fourth problem at the same time.

The fourth problem is sudden breakage of the die or upper and lower punching bars. It is extremely difficult to equalize the fiber volume fraction as the volume percentage of the fiber per unit volume in the raw fiber laminate before the hot pressing, and the laminate is partially sparse or dense. For this reason, in the application of pressure in the hot pressing, a non-uniform load is put on the laminate. Then, a load larger than expected one will be put on a section of the laminate which is higher in fiber volume fraction, as compared with a section of the laminate which is lower in fiber volume fraction. This non-uniform load may suddenly break the carbon die. Moreover, the shock may be also propagated to the upper and lower punching bars made of carbon to break the punching bars. These types of sudden breakage of the die and punching bars may cause damage to a heater of and an insulator of the hot pressing device in some cases. Furthermore, this sudden breakage is expected to occur with further increased frequency as the size of the laminate and the load put on the punching bars and the carbon die are increased. It is effective to sandwich a high-toughness ceramic composite material or a carbon fiber-reinforced carbon composite (CC composite) between the laminate and the die in order to prevent the sudden breakage of the die and the propagation of the shock to the upper and lower punching bars, but this is not a fundamental solution in itself. In order to increase the size of the shaped inorganic fiber-bonded ceramic material in the future, there is a need to prevent the sudden damage.

In the present embodiment, because the use of the flowable powder as the ceramic powder can reduce the sparsity or density of the laminate in fiber volume fraction, the uneven application of pressure is resolved in the hot pressing, and the partially concentrated load can be prevented from suddenly breaking the carbon die. In order to increase the flowability of the ceramic powder, it is also effective to, for example, make particles of the powder spherical with the use of a spray dryer or the like and use the powder of the spherical particles.

Next, the pressing in the first pressing step and second pressing step will be specifically described. First, the laminate is put into a carbon die for use in pressing so as to be covered with the ceramic powder, with punching bars for pressing set thereon, and put into a pressing device. In this case, the carbon die may be sprayed with BN in order to improve the mold release property between the carbon die and the ceramic powder. In addition, sandwiching a carbon sheet between the carbon die and the ceramic powder is also an effective measure for improving the mold release property. Likewise, as for the mold release property between the ceramic powder and the laminate, sandwiching a carbon sheet between the ceramic powder and the laminate can facilitate the removal of the shaped product of the inorganic fiber-bonded ceramic material after hot press molding.

After setting the die in the hot pressing device, the atmosphere is substituted with an inert atmosphere. Then, the laminate is covered with a ceramic material of the densified ceramic powder, and the temperature is increased up to the temperature set in the first pressing step in the range of 1000 to 1800° C. to provide a condition hermetically sealed to such an extent that the emission of pyrolysis gas from the laminate is suppressed. The rate of temperature increase in this case is not particularly specified, but a rate of temperature increase is preferred which results in a small difference in temperature between the periphery and central part of the laminate. In addition, in order to equalize the temperature at the periphery and central part of the laminate, a period of time for maintaining a temperature may be set before the pressing at a temperature equal to or lower than the pressing temperature in the first pressing step. Then, a pressure load of 5 to 50 MPa is applied at the pressing temperature in the first pressing step. This pressing may be carried out with the temperature maintained, or while rising the temperature. After the pressing in the first pressing step, in succession, the temperature can be increased up to a predetermined temperature in the range of 1600 to 1900° C., which is higher than the pressing temperature in the first pressing step, and a pressure load of 5 to 100 MPa can be applied to perform the pressing in the second pressing step. The rate of temperature increase from the first pressing step to the second pressing step is desirably a rate of temperature increase, which results in a small difference in temperature between the periphery and central part of the laminate as in the case of the first pressing step, and a period of time for maintaining a temperature may be set in order to equalize the temperature at the periphery and central part of the laminate.

The pressing in the first pressing step and the pressing in the second pressing step may be carried out at an interval, or carried out continuously. However, where after completing the pressing in the first step, once the temperature is lowered, the ceramic material in the hermetically sealed condition may be cracked to release, from the crack, pyrolysis gas from the inorganic fiber in some cases before increasing the temperature up to the pressing temperature in the second pressing step. In addition, also from the perspective of making the pressing steps more efficient, the pressing in the first pressing step and the pressing in the second pressing step may be preferably carried out continuously.

The atmospheres in the first pressing step and second pressing step are an inert gas atmosphere, typically, preferably an argon gas atmosphere. In addition, it is also effective to increase the atmosphere pressures, as a method for increasing the effect when the ceramic powder is sintered to control the gas generated by pyrolysis. The increased atmosphere pressure in the hot pressing device has the effect of reducing the emission of the gas generated by pyrolysis reaction. In addition, the increase in atmosphere pressure is an effective measure for preventing the emission of pyrolysis gas due to variation in the hermetically sealed condition of the ceramic powder. The atmosphere pressure increased from the start of the temperature increase can also inhibit pyrolysis before the ceramic powder is sintered. The atmosphere pressure typically falls within the range of 0.01 to 1 MPa, in particular, the range of 0.1 to 1 MPa preferably. However, in order to keep voids from being involved in the inorganic fiber-bonded ceramic material, the atmosphere pressure needs to be equal to or lower than the pressing pressure.

EXAMPLES

The present invention will be described below with reference to examples and comparative examples. First, examinations and characteristic evaluations were carried out on inorganic fiber-bonded ceramic materials according to the examples and comparative examples as follows.

(Fluorescent Penetrant Inspection)

Fluorescent penetrant inspections for use in inspection of precision machinery components were carried out in order to examine surface defect states at ends and central parts of the inorganic fiber-bonded ceramic materials molded. Here is the method for the fluorescent penetrant inspections. First, the surfaces of the shaped inorganic fiber-bonded ceramic materials were subjected to grinding to remove a thickness of about 0.5 to 1 mm by means of a surface grinder, then cleaned with ethanol to wash out contaminations, etc. such as adherent matters and oil and fats which disturb penetration of penetrants, and dried at 70° C. Next, a penetrant (Super Glow fluorescent penetrant agents, OD-2800 III) was applied by brush coating, left as it was for about 10 minutes, and lightly washed with running water, and a minute amount of developer (Super Glow, DN-600P) was sprayed. Then, after leaving out for about 5 minutes, an ultraviolet irradiator with a degree of ultraviolet intensity (800 $\mu W/cm^2$ or more) capable of clearly identifying a specified pattern was used to immediately conduct ultraviolet irradiation with a wavelength of 330 to 360 nm in a dark place, and the surfaces were visually observed, and photographed.

(Four-Point Bending Test)

From the inorganic fiber-bonded ceramic material subjected to the second pressing step, four-point bending test pieces of 4 mm in width, 3 mm in height, and 40 mm in length were collected, and subjected to a four-point bending test at a distance of 10 mm between upper supports, a distance of 30 mm between lower supports, and a crosshead speed of 0.5 mm/min with the use of a material tester to measure the bending strength from an end to a central part for the shaped inorganic fiber-bonded ceramic materials.

Example 1

A satin fabric was prepared using Tyranno Fiber (registered trademark: from Ube Industries, Ltd.) of 8.5 µm in fiber diameter as the inorganic fiber, cut into squares of 80 mm×80 mm, and retained for 20 hours in air at 1000° C. to obtain fabric sheets of coated inorganic fiber including an inorganic fiber part and a surface layer. A uniform surface layer having an average thickness of 510 nm, which corresponds to a=0.06, was formed on the surface of the coated inorganic fiber. The symbol "a" herein refers to a=T/D when the thickness of the surface layer of the coated inorganic fiber and the diameter of the inorganic fiber thereof are respectively denoted by T μm and D μm. Then, 100 sheets of satin fabric were stacked to prepare a laminate in which the sheets are fixed with an organic binder. The inorganic fiber part of the coated inorganic fiber in the laminate was composed of a mixture of: an amorphous substance containing mainly Si, Ti, C and O; and an aggregate of crystalline ultrafine particles containing β-SiC, TiC and C, and an amorphous substance containing $SiO_2$ and $TiO_2$, whereas the surface layer was mainly composed of an amorphous substance containing Si, O and Ti.

Next, the prepared laminate was set in a carbon die.

Figure 1:
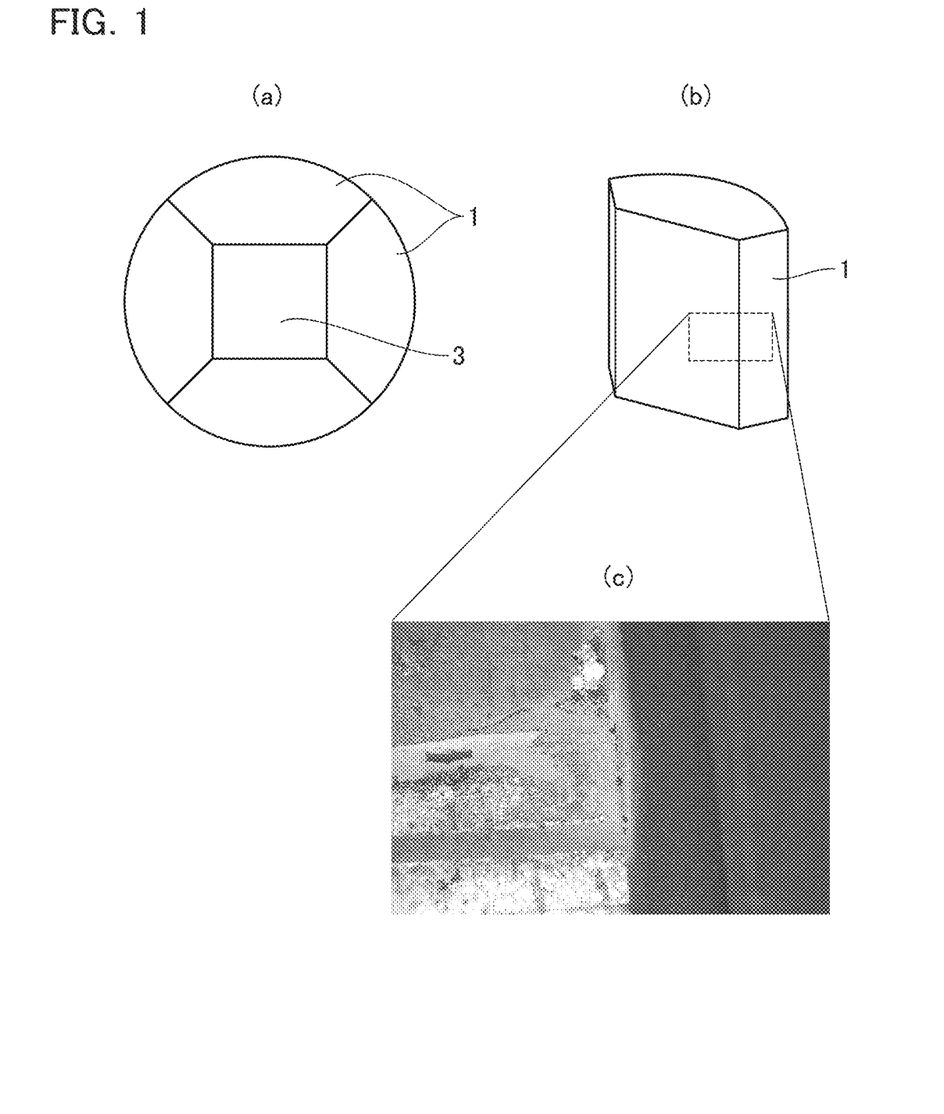
FIG. 1(a) is a top view of a die including four parts for use in the present examples.
FIG. 1(b) is a perspective view of one part after the die is separated.
FIG. 1(c) is a magnified photograph of a dotted line region of FIG. 1(b), and these figures are a photograph showing a typical die with an inner surface damaged by the influence of gas generated by pyrolysis, and schematic diagrams indicating the location of the die photographed.

FIG. 1 shows a photograph of a die used in the pressing in the first pressing step and second pressing step according to the present example. FIG. 1(a) is an plan view of a die including four parts, FIG. 1(b) is a perspective view of one part when the die is separated, and FIG. 1(c) is a magnified photograph of a dotted line region of the part in the perspective view of FIG. 1(b). One die is formed of four parts as shown in FIG. 1(a), and can be separated into the four parts. FIG. 1(b) is a perspective view of one of the parts, and the inside of the part has an inner surface, which is brought into contact with the punching bars, laminate, ceramic powder, etc. when used for the pressing, and is damaged by the influence of gas generated by pyrolysis. A typical example of the damaged die is shown in FIG. 1(c). The die used in the present example is a square carbon die of 90 mm×90 mm in inner dimension, which normally presents difficulty to production of inorganic fiber-bonded ceramic shaped products, and has a damaged die surface. An uneven appearance, which was formed under the influence of gas generated by pyrolysis, is observed on the inner surface of the die.

A method for setting the laminate on the carbon die will be described with reference to FIG. 2(a). First, carbon sheets 6 were arranged on side surfaces of a carbon die 1 (carbon mold) with a lower punching bar 10 set thereon. Next, a CC composite material spacer 5 of 5 mm in thickness was placed on the lower punching bar 10 set, a carbon sheet 6 of 0.2 mm in thickness was laid thereon, and an alumina powder 8 was packed by 120 g, and the surface was adjusted to be flat. Then, a carbon sheet 6 was laid on the alumina powder 8, and a laminate 7 was placed. Next, the gaps between the laminate 7 (80 mm×80 mm) and the die 1 (90 mm×90 mm) were filled with the alumina powder 8 by 30 g, furthermore, a carbon sheet 6 was laid on the laminate 7, and the alumina powder 8 was also packed thereon by 120 g, and the surface was adjusted to be flat. Thus, the laminate 7 is surrounded by the alumina powder 8. Thereafter, a carbon sheet 6 was laid on the alumina powder 8, a CC composite material spacer 5 was arranged thereon, and finally, an upper punching bar 4 was set.

Figure 2:
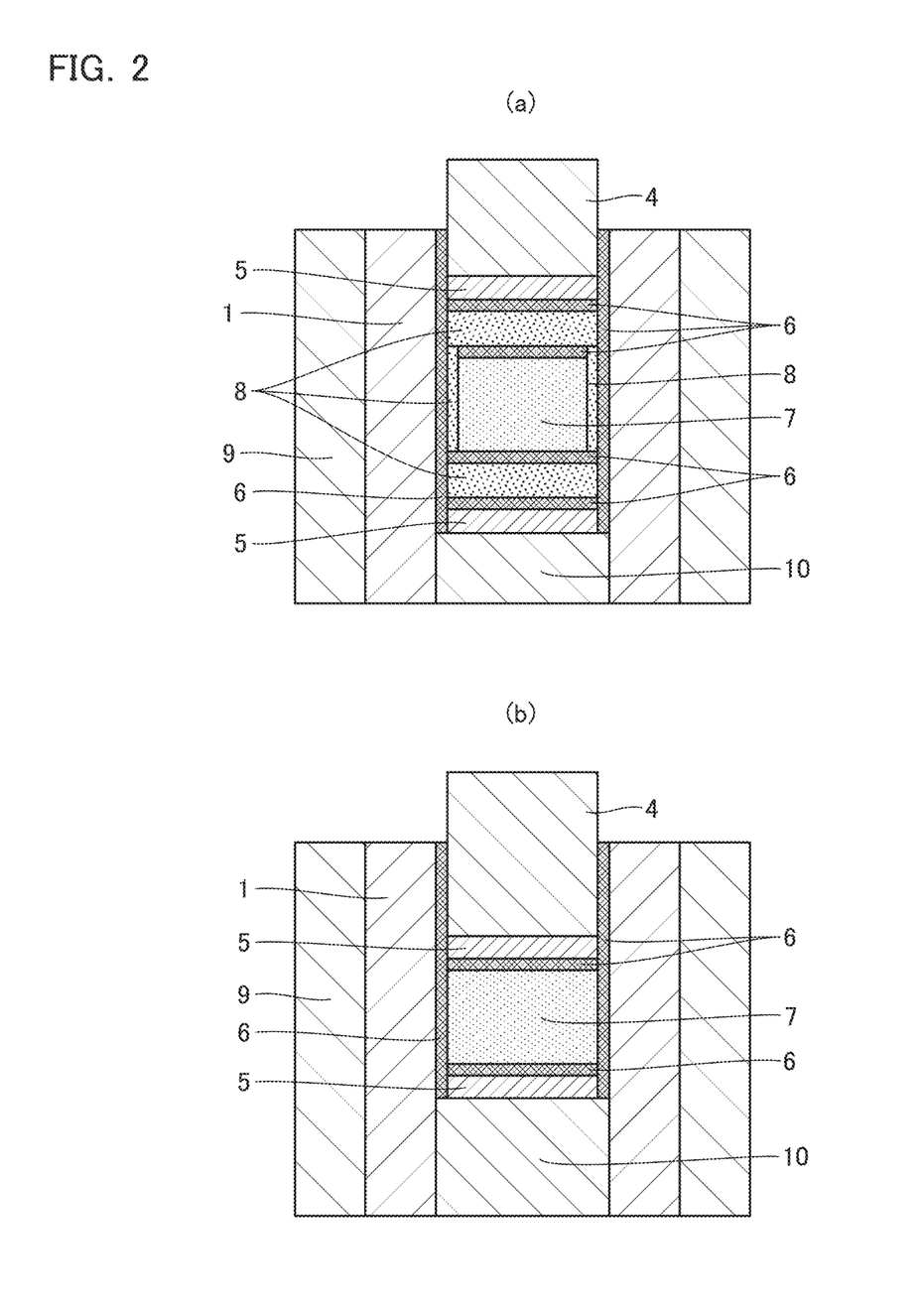
FIG. 2(a) is a conceptual diagram showing arrangement of a laminate surrounded by a ceramic powder in a die.
FIG. 2(b) is a conceptual diagram showing arrangement of a laminate in a die without the use of any ceramic powder.

FIG. 2(a) shows the laminate set in the carbon die. It is to be noted that though the carbon sheets 6 are highlighted because FIG. 2(a) is a schematic diagram, it is extremely unusual that pyrolysis gas is released to the outside of the die from the gaps between the alumina powder 8 and the carbon sheets 6 because the carbon sheets 6 are 0.2 mm in thickness and further reduced in thickness by the application of pressure, with the alumina powder 8 closely attached on the surfaces of the carbon sheets 6. In this condition, the pressing in the first pressing step was carried out at a temperature of 1400° C. and a pressure of 40 MPa under an argon atmosphere. Subsequently, with the pressure maintained, the temperature was increased to 1750° C., and maintained for 1 hour to carry out the pressing in the second pressing step, thereby providing an inorganic fiber-bonded ceramic material according to Example 1.

Example 2

Next, a laminate was set in a carbon die in accordance with the same procedure as in Example 1, subjected to the pressing in the first pressing step at a temperature of 1400° C. and a pressure of 40 MPa, and subsequently subjected to the pressing in the second pressing step by increasing the temperature to 1850° C. with the pressure maintained and maintaining the temperature for 1 hour, thereby providing an inorganic fiber-bonded ceramic material according to Example 2. The other condition is the same as in Example 1. The alumina surrounding the laminate was able to be easily removed by lightly tapping corners of the alumina with a plastic hammer, because it was cracked at room temperature resulting from cooling after the second pressing step due to a difference in thermal expansion between the fiber-bonded ceramic material and the alumina, and the carbon sheets were sandwiched between the alumina powder and the laminate.

FIGS. 3(a) and 3(b) show photographs after the fluorescent penetrant inspections on the obtained inorganic fiber-bonded ceramic materials according to Examples 1 and 2.

In comparison between the two inorganic fiber bonded ceramic materials, the inorganic fiber-bonded ceramic material according to Example 1 with the low molding temperature somewhat tends to have a smaller defective region (white region in the black and white photograph of FIG. 3) in the end part, while the detective region is small in each case. The white region in FIG. 3 indicates that there are voids at side surfaces of the inorganic fiber-bonded ceramic materials. These voids are believed to be produced because pyrolysis gas generated by pyrolysis reaction was excessively released to the outside of the die. The voids were confirmed, although described later, by observing side surfaces of the test pieces after the bending test under an electron microscope. It is to be noted that stripe patterns observed over the entire inorganic fiber-boned ceramic materials are weave patterns of the fibers, but not defects in the photographs after the fluorescent penetrant inspections.

Figure 4:
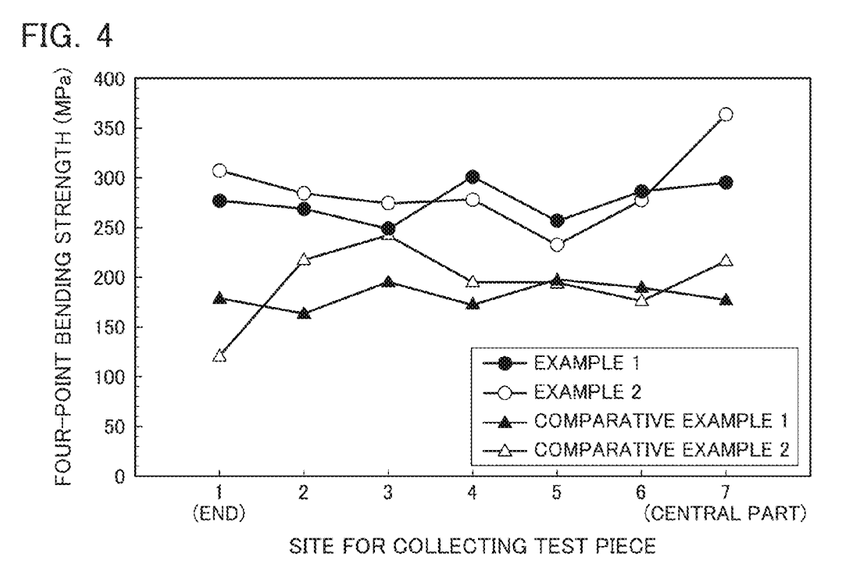
FIG. 4 is a diagram showing changes in four-point bending strength from ends to central parts of the inorganic fiber-bonded ceramic materials obtained in Examples 1 and 2 and Comparative Examples 1 and 2.
Figure 5:
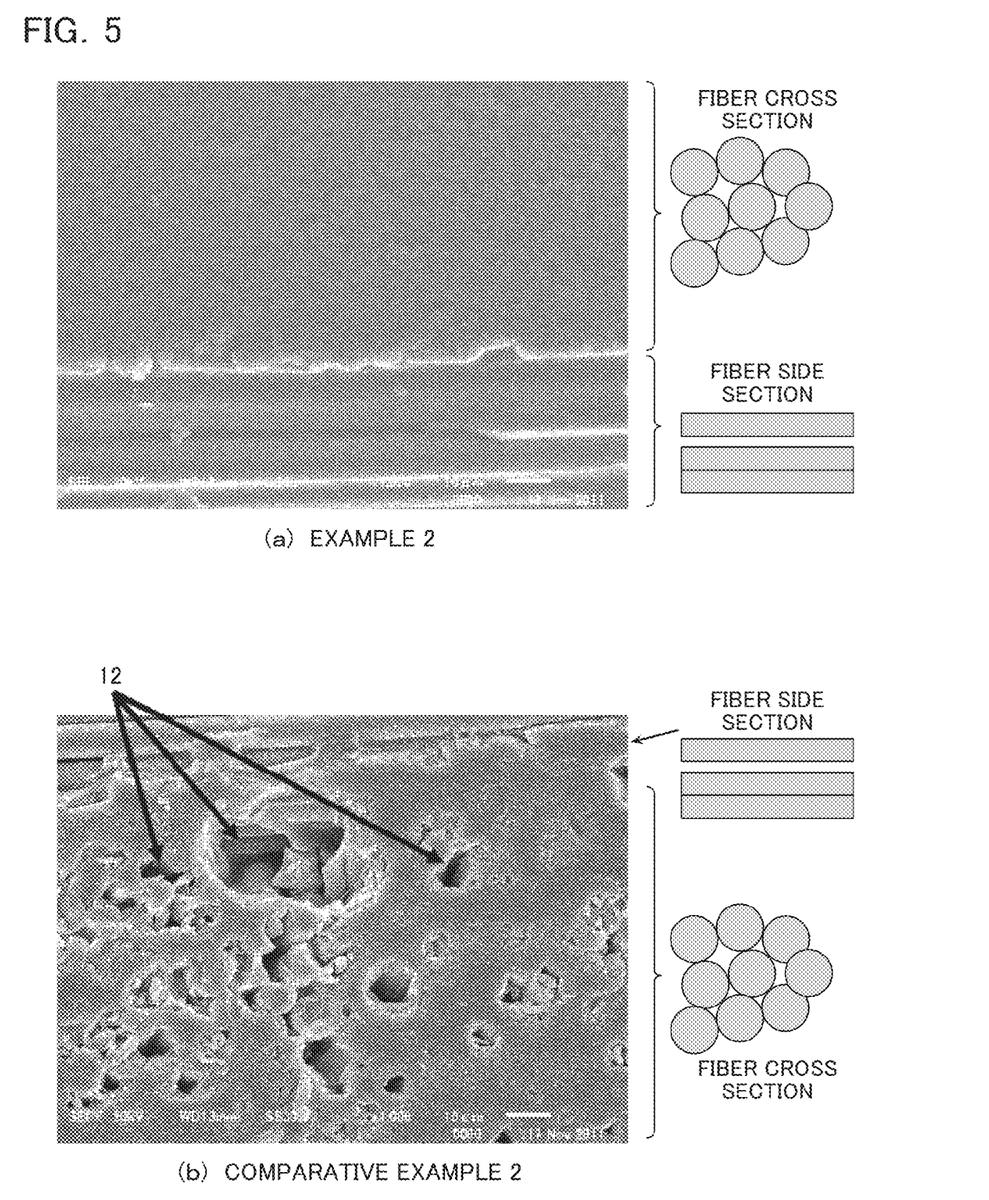
FIG. 5 shows photographs of results of observing, under an electron microscope, side surfaces of test pieces after carrying out a bending test on the inorganic fiber-bonded ceramic materials obtained in Example 2 and Comparative Example 2.

Next, FIG. 4 shows results of four-point bending tests from end parts to central parts of the inorganic fiber-bonded ceramic materials. In spite of the use of the damaged die, Examples 1 and 2 both maintained stable four-point bending strength from the end parts to the central parts. In addition, a side surface of the four-point bending test piece, which was collected from the end part, was observed with an electron microscope. The result is shown in FIG. 5. The gaps between the fibers are filled with the surface layer of the raw fiber, and there is no void observed. It has been determined that even the end part is equivalent to the central part in both microstructure and mechanical properties in the case of the inorganic fiber-bonded ceramic materials according to Examples 1 and 2. This result has demonstrated that the die which has been ever disposed of can be used, and determined that the lifetime of the die can be extended. Furthermore, the use of the laminate (80 mm×80 mm) which was 10 mm smaller with respect to the dimensions (90 mm×90 mm) of the die has succeeded in the previously described results in spite of the extremely large clearance between the die and the laminate.

Example 3

A satin fabric of Tyranno Fiber (registered trademark: from Ube Industries, Ltd.) of 8.5 μm in fiber diameter was cut into squares of 180 mm×180 mm, and a laminate was then prepared by stacking 500 sheets of stain fabric in the same way as in Example 1. As the carbon die, a large-size square carbon die of 190 mm×190 mm in inside dimension was used, which normally presents difficulty to preparation of inorganic fiber-bonded ceramic shaped products and has a damaged die surface. Though the laminate was set in the carbon die in the same manner as in Example 1, the alumina powder was put by 500 g under the laminate, by 80 g in the gaps between the laminate (180 mm×180 mm) and the die (190 mm×190 mm), and by 500 g on the laminate, because the gap volume was larger as compared with that in Example 1. In this condition, the pressing in the first pressing step was carried out at a temperature of 1400° C. and a pressure of 40 MPa under an argon atmosphere. Subsequently, with the pressure maintained, the pressing in the second pressing step was carried out under the conditions of temperature: 1750° C. and holding time: 2 hours to obtain an inorganic fiber-bonded ceramic material according to Example 3, which was larger than that in Example 1.

Figure 6:
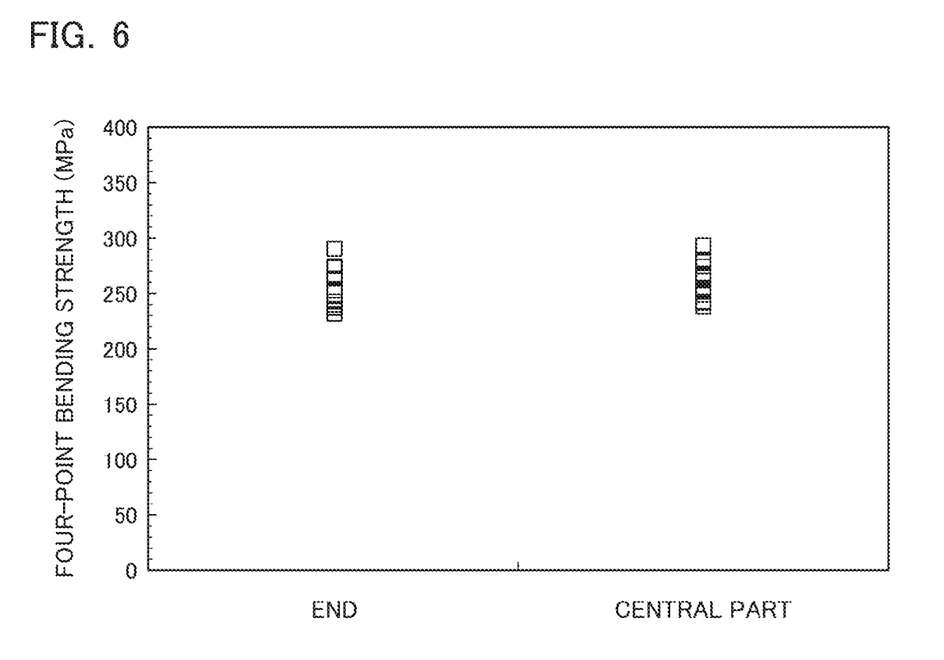
FIG. 6 is a diagram showing changes in four-point bending strength at an end and a central part of an inorganic fiber-bonded ceramic material obtained in Example 3.

From each of an end part and a central part of the 180 mm×180 mm surface of the obtained inorganic fiber-bonded ceramic material of 180 mm×180 mm surface and about 60 mm thickness according to Example 3, fifteen bending test pieces were collected in the thickness direction to measure the four-point bending strength of the end part and central part. The measurement results are shown in FIG. 6. In spite of the use of the damaged die, and of the large size as compared with that in Example 1, there is no variation in strength between the end part and central part of the inorganic fiber-bonded ceramic material according to Example 3. This result has demonstrated that the die which has been ever disposed of can be used, and it has been found that the lifetime of the die can be extended. In addition, the use of the laminate (180 mm×180 mm) which was 10 mm smaller with respect to the dimensions (190 mm×190 mm) of the die has succeeded in the previously described results in spite of the extremely large clearance between the die and the laminate. Moreover, in spite of being larger in form with the sparser or denser laminate as compared with Example 1, this example has succeeded in molding the inorganic fiber-bonded ceramic material, without sudden breakage of the die, etc., or without any variation in strength between the central part and the end part.

Comparative Example 1

A satin fabric of Tyranno Fiber (registered trademark: from Ube Industries, Ltd.) of 8.5 μm in fiber diameter was cut into squares of 89 mm×89 mm, and then treated for 20 hours in air at 1000° C. to obtain fabric sheets of coated inorganic fiber including an inorganic fiber part and a surface layer. A uniform surface layer having an average thickness of 510 nm, which corresponds to a=0.06, was formed on the surface of the coated inorganic fiber as in the examples. Next, hot pressing was carried out with the use of a square carbon die of 90 mm×90 mm in inside dimension, which normally presents difficulty to the preparation of inorganic fiber-bonded ceramic shaped products, and has a damaged die surface as in the case of Example 1. The method for setting the laminate in the die will be described with reference to FIG. 2(b). First, carbon sheets 6 were arranged on side surfaces of a carbon die 1 (carbon mold) with a lower punching bar 10 set. Next, a CC composite material spacer 5 of 5 mm in thickness was placed on the lower punching bar 10 set, a carbon sheet 6 of 0.2 mm in thickness was laid thereon, and a laminate 7 was placed thereon. The laminate 7 was composed of 100 sheets of fabric stacked and fixed with an organic binder. Then, a carbon sheet 6 was laid thereon, furthermore, a CC composite material spacer 5 was placed on the carbon sheet 6, and finally, an upper punching bar 4 was set. FIG. 2(b) shows the laminate set in the carbon die. Then, hot press molding was carried out under the conditions of pressure: 40 MPa, temperature: 1750° C., and holding time: 1 hour under an argon atmosphere as in the case of Example 1 to obtain an inorganic fiber-bonded ceramic material according to Comparative Example 1.

Comparative Example 2

Next, a laminate was set in a carbon die in accordance with the same procedure as in Comparative Example 1, and subjected to hot press molding at a temperature of 1850° C. to obtain an inorganic fiber-bonded ceramic material according to Comparative Example 2. The other condition is the same as in Comparative Example 1.

Figure 3:
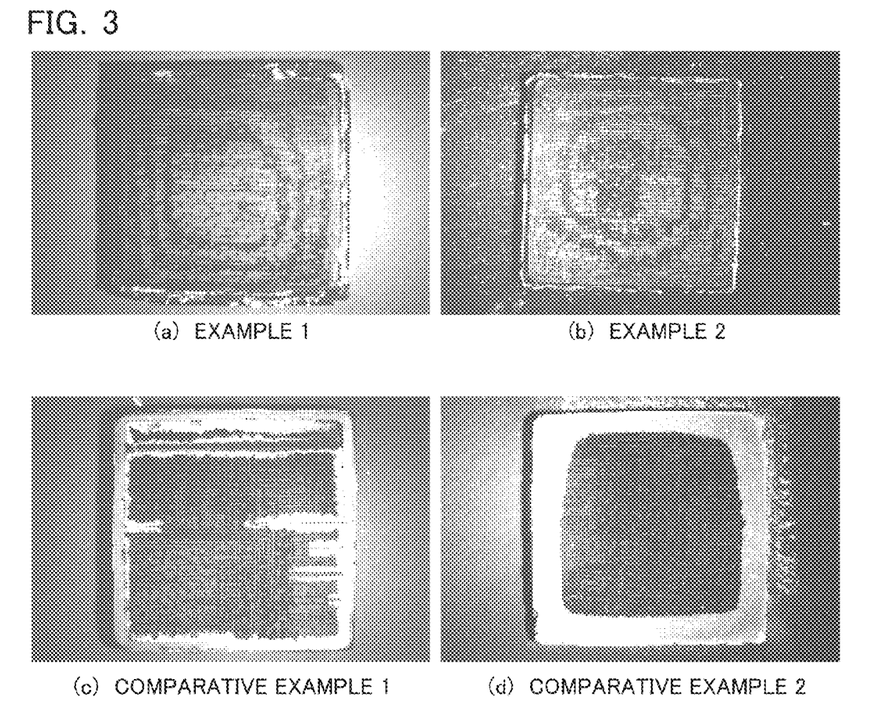
FIG. 3 shows photographs of visual observation results after fluorescent penetrant inspections for inorganic fiber-bonded ceramic materials obtained in Examples 1 and 2 and Comparative Examples 1 and 2.

FIG. 3 shows photographs after the fluorescent penetrant inspections on the obtained two types of inorganic fiber-bonded ceramic materials according to Comparative Examples 1 and 2. FIGS. 3(c) and 3(d) respectively show the results of Comparative Examples 1 and 2. The (c) Comparative Example 1 with the molding temperature of 1750° C. has a white region reaching the central part in the black and white photograph. This indicates that the surface has defects (cracks). Moreover, the (d) Comparative Example 2 with the molding temperature of 1850° C. has a slightly larger white region at the end, as compared with Comparative Example 1. This indicates that the end part has a large number of defects (voids located from the side surface toward the central part of the inorganic fiber-bonded ceramic material), and the area of the defects is extended with the increase in molding temperature. When both the inorganic fiber-bonded ceramic materials in obtained Comparative Examples 1 and 2 are compared with the inorganic fiber-bonded ceramic materials obtained in Examples 1 and 2, Comparative Example 1 has cracks, and Comparative Example 2 has defects (voids) extended toward the surface at the end. Next, FIG. 4 shows results of four-point bending tests from end parts to central parts of the inorganic fiber-bonded ceramic materials according to Comparative Examples 1 and 2. Because of the use of the damaged die, Comparative Examples 1 and 2 both vary significantly in four-point bending strength from the end part to the central part, and for every point, all represent lower values as compared with the four-point bending strength in the examples. In addition, FIG. 5(b) shows the result of observing, under an electron microscope, a side surface of the four-point bending test piece collected from the end part. The end part of the inorganic fiber-bonded ceramic material has a large number of voids observed. This result well agrees with the result of the fluorescent penetrant inspection.

From the foregoing, it is determined that according to the present invention, even the use of a damaged die with poor dimensional accuracy, which ever has difficulty with control of gas generated by pyrolysis in the hot press process, can achieve a dense inorganic fiber-bonded ceramic material without any voids even at an end part, which maintains a high mechanical properties from a central part to the end part.

The inorganic fiber-bonded ceramic material obtained by the method for producing an inorganic fiber-bonded ceramic material according to the present invention can be used under harsh environments at high temperature, including oxidizing atmospheres at 1000° C. or higher in air, excellent in heat resistance, and high in both heat insulation property and mechanical properties.

REFERENCE SIGNS LIST 1 carbon die (parts)
3 position for setting laminate
4 upper punching bar
5 CC composite spacer
6 carbon sheet
7 laminate
8 alumina powder
9 CC composite mold
10 lower punching bar
12 void

The invention claimed is:

1. A method for producing an inorganic fiber-bonded ceramic part, comprising:
 a first pressing step of setting a laminate in a carbon die so as to be surrounded by an alumina powder, the laminate being obtained by stacking a coated inorganic fiber shaped product including an inorganic fiber part formed of inorganic fibers having a pyrolysis initiation temperature of 1900° C. or lower and a surface layer formed of an inorganic substance for bonding the inorganic fibers to each other, and pressing the laminate at a temperature of 1000 to 1800° C. and a pressure of 5 to 50 MPa in an inert gas atmosphere to obtain the laminate coated with densified alumina powder in a sealed condition to such an extent that an emission of pyrolysis gas is suppressed; and
 a second pressing step of pressing the alumina coated laminate obtained in the first pressing step at a temperature of 1600 to 1900° C., which is higher than that in the first pressing step, and at a pressure of 5 to 100 MPa in an inert gas atmosphere.

2. The method for producing an inorganic fiber-bonded ceramic part according to claim 1, wherein the inorganic fiber part is formed of an inorganic substance containing:
 (a) an amorphous substance containing Si, M, C, and O (M represents Ti or Zr);
 (b) an aggregate of a crystalline particle containing β-SiC, MC, and C and an amorphous substance containing $SiO_2$ and $MO_2$ (M is the same as in (a)); or
 (c) a mixture of the (a) amorphous substance and the (b) aggregate, and the surface layer is formed of an inorganic substance containing:
 (d) an amorphous substance containing Si, O, and optionally M (M represents Ti or Zr);
 (e) a crystalline substance containing crystalline $SiO_2$ and/or $MO_2$ (M is the same as in (d)); or
 (f) a mixture of the (d) amorphous substance and the (e) crystalline substance.

3. The method for producing an inorganic fiber-bonded ceramic part according to claim 1, wherein the surface layer has a thickness T (μm) from T=aD in which a is a numerical value in a range of 0.023 to 0.090, and D denotes a fiber diameter (μm) of the inorganic fiber part.

4. The method for producing an inorganic fiber-bonded ceramic part according to claim 1, wherein an ambient pressure in the first pressing step and the second pressing step ranges 0.01 to 1 MPa.

5. A method for producing an inorganic fiber-bonded ceramic part, comprising:
 a first pressing step of setting a laminate in a carbon die so as to be surrounded by a ceramic powder, the laminate being obtained by stacking a coated inorganic fiber-shaped product including an inorganic fiber part formed of inorganic fibers having a pyrolysis initiation temperature of 1900° C. or lower and a surface layer formed of an inorganic substance for bonding the inorganic fibers to each other, and pressing the laminate at a temperature of 1000 to 1800° C. and a pressure of 5 to 50 MPa in an inert gas atmosphere to obtain the laminate coated with the ceramic powder in a sealed condition to such an extent that an emission of pyrolysis gas is suppressed; and
 a second pressing step of pressing the ceramic coated laminate obtained in the first pressing step at a temperature of 1600 to 1900° C., which is higher than that in the first pressing step, and at a pressure of 5 to 100 MPa in an inert gas atmosphere,
 wherein the ceramic powder includes a mixture of an inorganic substance, which melts at 1800° C. or lower, and an inorganic substance having a higher melting temperature than the pressing temperature in the second pressing step.

6. The method for producing an inorganic fiber-bonded ceramic part according to claim 5, wherein the inorganic substance, which melts at 1800° C. or lower, is glass containing $SiO_2$ as its main constituent, and the inorganic substance having a higher melting temperature than the pressing temperature in the second pressing step is carbon or BN.

* * * * *